United States Patent [19]

Nassoy et al.

[11] Patent Number: 4,603,488
[45] Date of Patent: Aug. 5, 1986

[54] PROCESS AND APPLIANCES FOR THE PRE-SETTING OF CUTTING AND EJECTION TOOLS IN A CUTTING PRESS FOR BOX BLANKS

[76] Inventors: Jacques Nassoy, 14, rue Capitaine Dumont, St. Quentin; Bernard Protin, 3, ch. Croix Etienne, F-21600 Sennay, both of France

[21] Appl. No.: 702,330

[22] Filed: Feb. 15, 1985

Related U.S. Application Data

[62] Division of Ser. No. 345,354, Feb. 3, 1982, Pat. No. 4,510,667.

[30] Foreign Application Priority Data

Feb. 3, 1981 [FR] France ............................. 81 02006

[51] Int. Cl.⁴ .............................................. B23B 49/02
[52] U.S. Cl. ......................................... 33/562; 33/189
[58] Field of Search ................ 33/562, 563, 566, 189, 33/191

[56] References Cited

U.S. PATENT DOCUMENTS

| | | | |
|---|---|---|---|
| 1,995,711 | 3/1935 | Irmis | 29/465 |
| 2,548,197 | 4/1951 | Conner | 33/562 |
| 2,939,347 | 6/1960 | Tobey | 76/107 C |
| 3,152,505 | 10/1964 | Alldis | 33/189 |
| 3,170,342 | 2/1965 | Downie | 76/107 C |
| 3,246,399 | 4/1966 | Southern | 33/562 |
| 3,249,272 | 5/1966 | Scarpa | 493/342 X |
| 3,653,304 | 4/1972 | Lenoir | 493/342 X |
| 3,738,013 | 6/1973 | Gregory | 33/562 |
| 3,775,857 | 12/1973 | Handy | 33/189 |
| 3,874,086 | 4/1975 | Ludlam | 33/562 |
| 3,962,083 | 11/1962 | Strnad | 76/107 C X |
| 4,015,495 | 4/1977 | Yerly | 493/342 X |
| 4,112,827 | 9/1978 | Kang | 76/107 C X |
| 4,257,166 | 3/1981 | Barker et al. | 33/189 |

FOREIGN PATENT DOCUMENTS

255865  10/1964  Australia ........................ 76/107 C

Primary Examiner—Willis Little
Attorney, Agent, or Firm—Hill, Van Santen, Steadman & Simpson

[57] ABSTRACT

A method and apparatus for pre-setting the mounting holes for cutting and ejection tools characterized by a template which has a pattern of holes including centering holes and an arrangement for positioning both a cutting form and an ejection board whether it is the first or second ejection board relative to the cutting form. In the method, the cutting form is placed on the template and the centering holes are formed. Then with a pin received in each of the centering holes formed in the board, the mounting holes are formed utilizing the holes of the template for guiding a drill, then an ejection board such as the second ejection board is aligned on the template with the cutting form and has centering holes formed using the centering holes of the template and the cutting form to guide and locate the drill bit. Additional mounting holes can be formed after providing the centering holes. Next, the second board is replaced by the first board, which has its centering holes formed utilizing the centering holes of the template and the cutting form to guide the drill and then after removal of the cutting form additional mounting holes which are arranged in at least two separate groups are formed.

8 Claims, 17 Drawing Figures

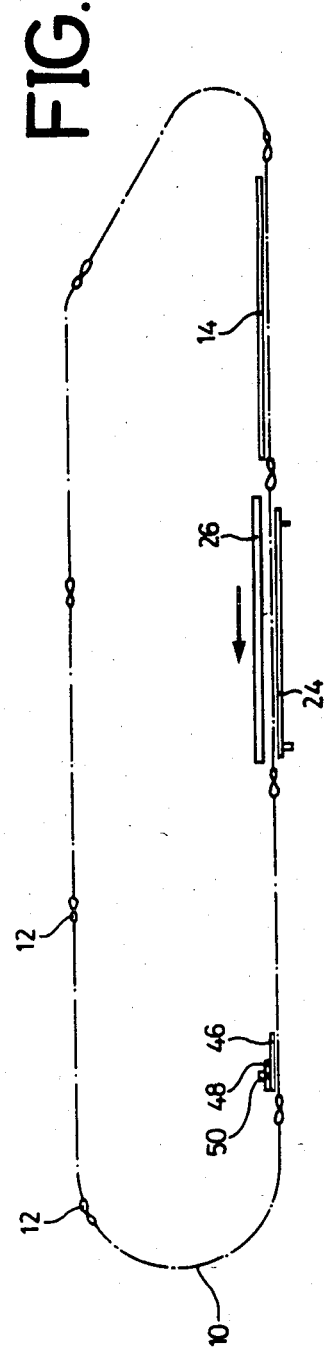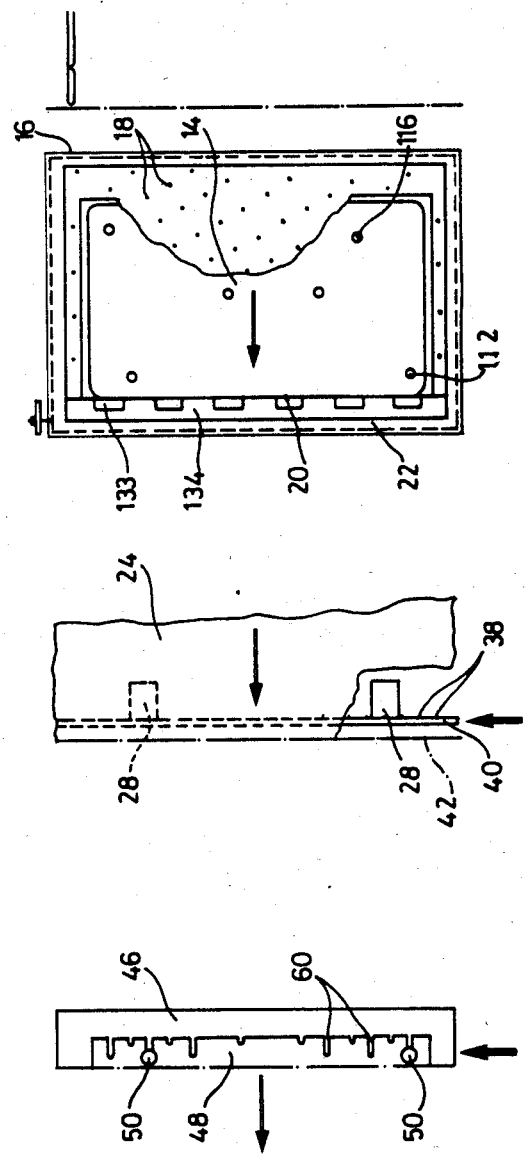

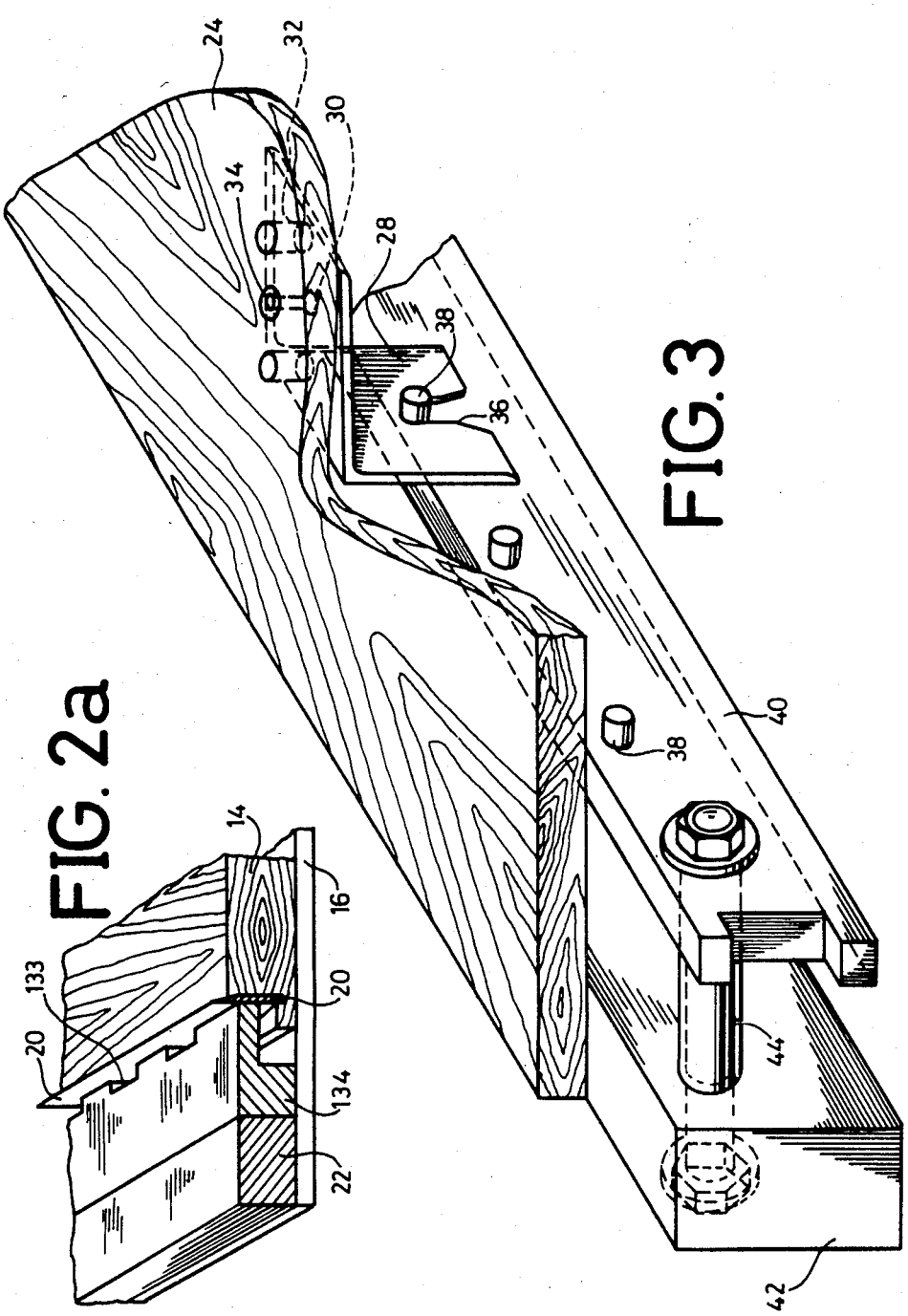

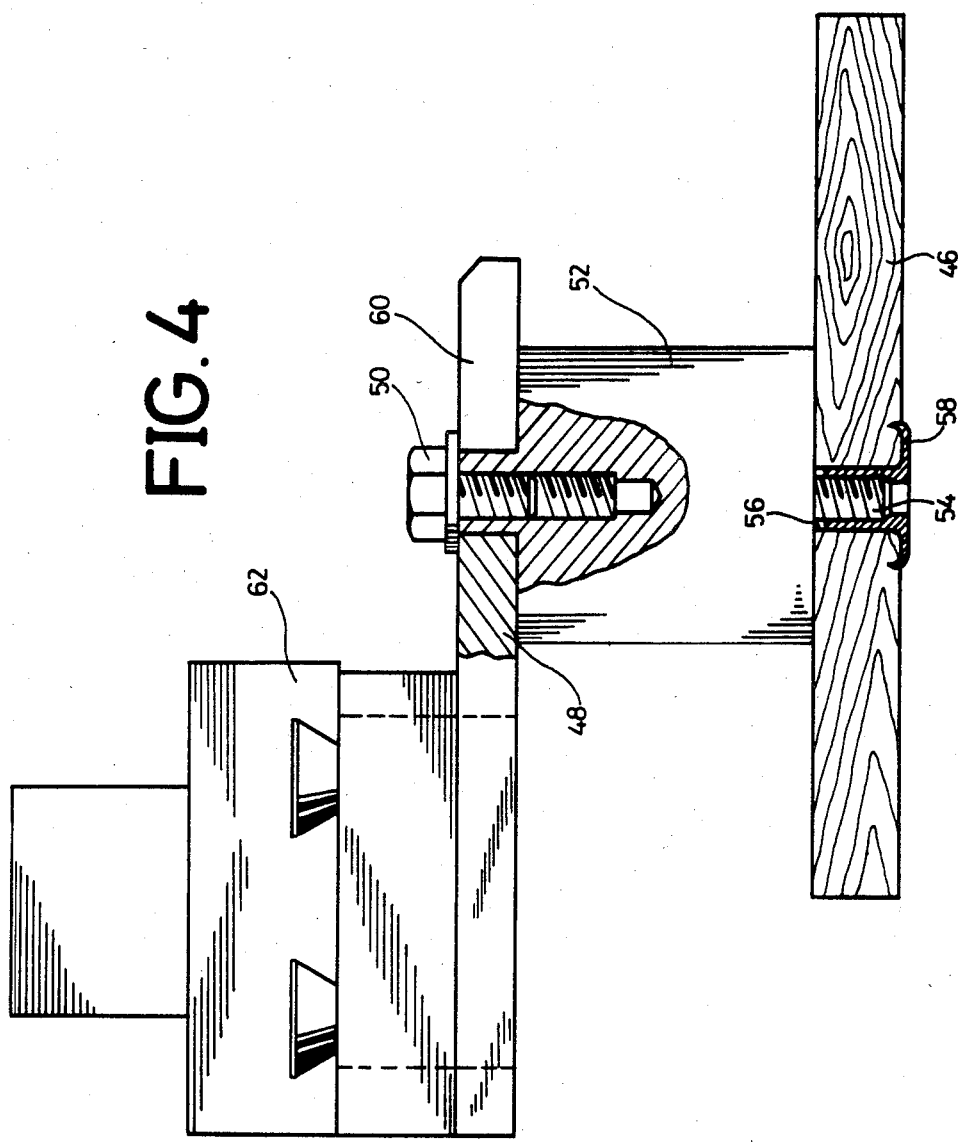

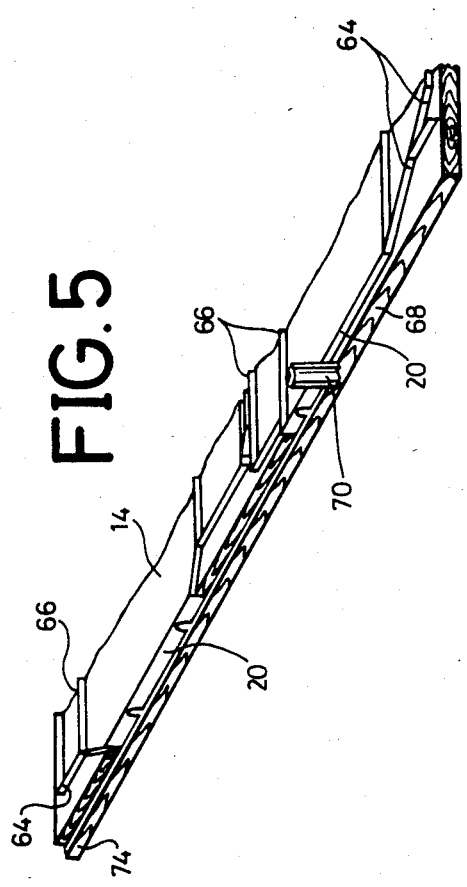
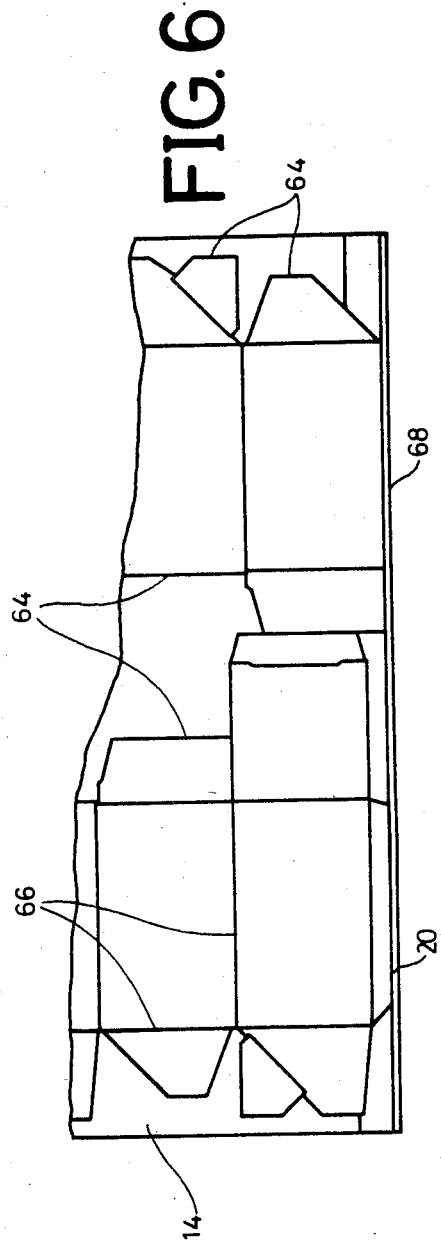

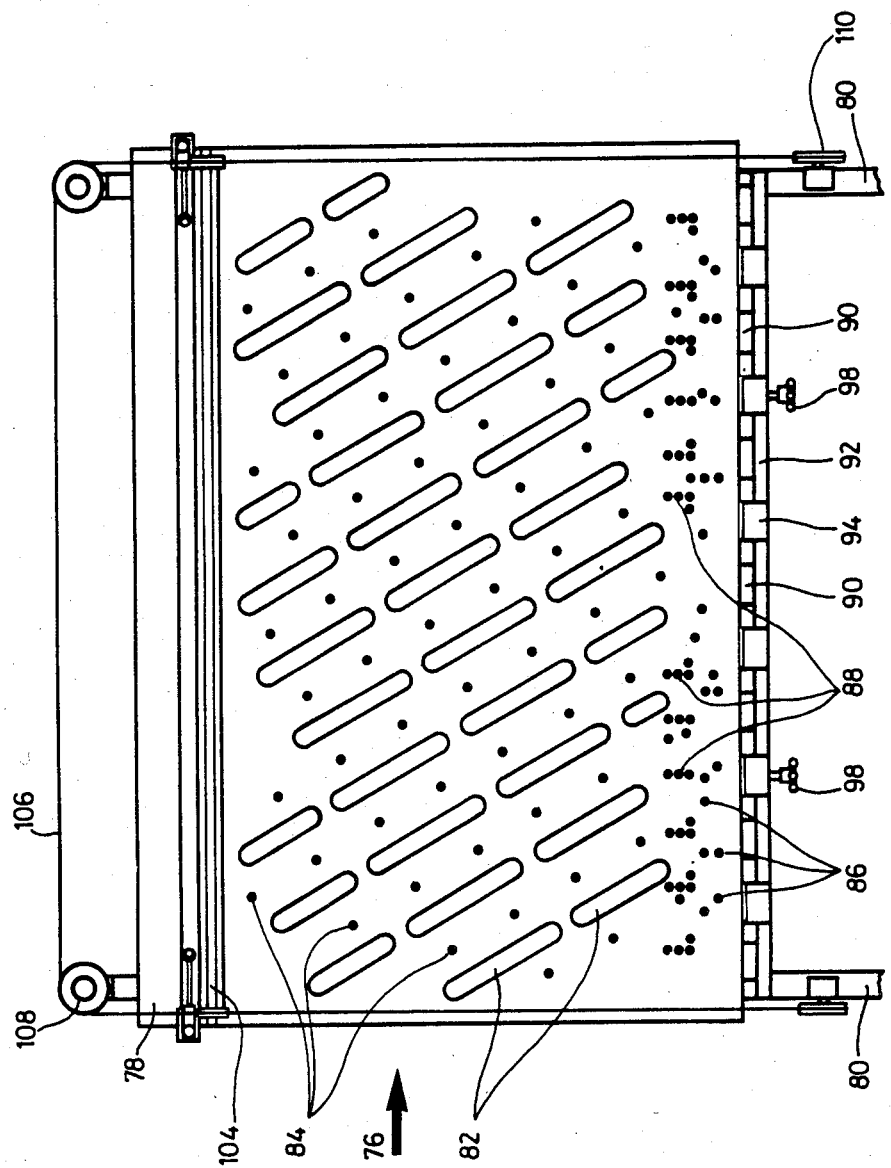

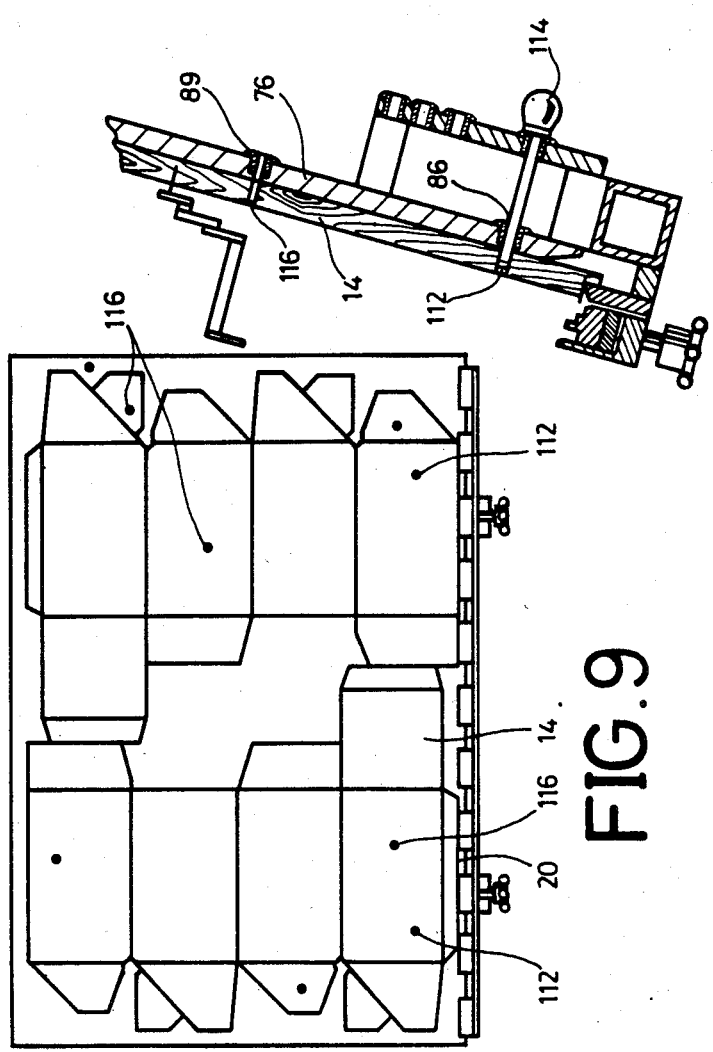
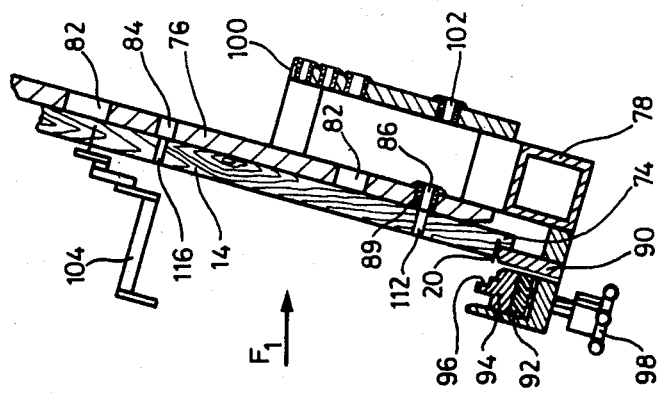

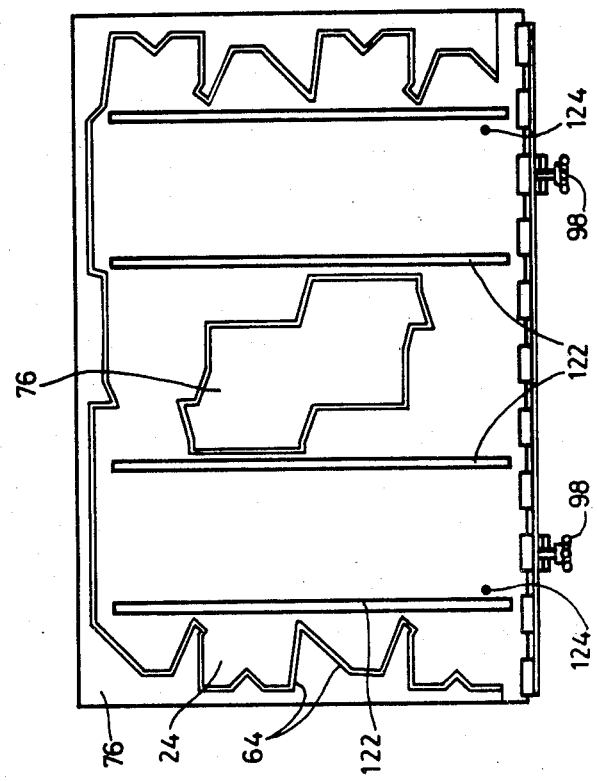
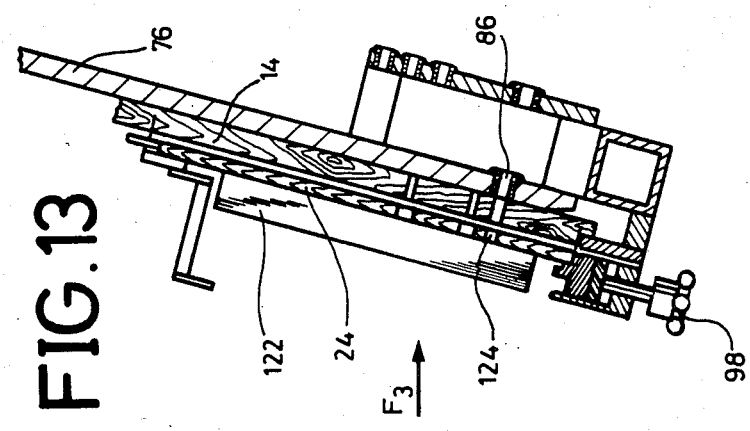

4,603,488

PROCESS AND APPLIANCES FOR THE PRE-SETTING OF CUTTING AND EJECTION TOOLS IN A CUTTING PRESS FOR BOX BLANKS

CROSS REFERENCE TO A RELATED APPLICATION

This application is a division of application Ser. No. 345,354, filed Feb. 3, 1982 which issued as U.S. Pat. No. 4,510,667 on Apr. 16, 1985.

BACKGROUND OF THE INVENTION

The present invention relates to a method and an apparatus for presetting the three tools necessary for cutting and for the ejections of an automatic platen press for cutting cardboard box-blanks.

In the manufacture of box-blanks for cardboard packing cases it is known to employ automatic platen presses with three stations. In the first station there is mounted a cutting form made up of a rigid board, generally of wood, on one face of which cutting rules and creasing rules are fitted intended to respectively cut the cardboard box-blank according to the desired contour and to impress thereupon the different lines of creasing and of folding back. The box-blank, thus cut and scored, is seized by adequate gripping means along a border called a gripping engagement and entrained by transport means to the second station in which is mounted a board of first ejection having the same dimensions as the finished box-blank. The board of first ejection cooperates with a press cradle in order to strip the cutting wastes and eject them. The box-blank is finally conducted to the third station where there is disposed a board of second ejection which cooperates with a press cradle in order to sever the cut box-blank from the gripping engagement.

The known automatic platen presses of this type have the disadvantage of exhibiting, from one model to the other, dimensional differences, and, more particularly, differences in the margin left between the peripheral edge of the cutting form and the first cutting rule defining the edge of the box-blank. The result of this is that the tools of one press model cannot be utilized on another model.

Moreover, the registering of the tools relative to one another cannot be effected presently with sufficient precision, which entails an important loss of time in the setting of the tools as well as risks of imprecision shown by a poor cut of the box-blank or even a deterioration of the tools.

SUMMARY OF THE INVENTION

The present invention has as its object the remedying of these disadvantages and proposes, to this end, a presetting method which permits the effecting, outside the press, of operations of centering of the cutting form and of the boards of the first and second ejection in such a manner that the latter can be set back very rapidly and with a great precision into the corresponding stations of the automatic platen press.

To this end the method according to the invention consists in utilizing a pre-mounting template, comprising means of longitudinal positioning of the tools, identical to corresponding means, provided on the support elements of said tools on the press, and a plurality of holes arranged according to a distribution which is identical to that of the corresponding elements formed on said support elements, and through which fixation holes can be drilled on the correctly positioned tools, in such a fashion that the tools can be transferred from the template to the press in preserving the same relative longitudinal and transverse arrangements.

More precisely, the method according to the invention consists in milling one edge of the cutting form until it is flush with the first cutting rule running along said edge so as to cause a rectilinear abutment to appear in registry on said first rule, to arrange the cutting form on said template, with said first cutting rule being supported on a fixed rectilinear stop provided on the lower board of the template, to drill two centering holes in the lower part of the cutting form through a series of holes provided in the template, to introduce, in each of these holes, a pin intended to render immobile the form during the subsequent operations, to drill on the form a plurality of fixation holes distributed in the best possible fashion and selected among a range of holes pre-drilled on the template, to place the second ejection board on the template, with its lower edge supported on a horizontal bar mounted in vertically mobile fashion on the template, to shift the bar in order to lead the lower edge of the second ejection board perpendicular to the first cutting rule of the form, to finally drill centering holes facing those made on the form, in alternately removing one pin then the other, to remove the second ejection board and to put in its place the first ejection board which one centers on the inside of cutting rules of the circumference of the form, to drill on the first ejection board two centering holes perpendicular to those made on the form, to remove the cutting form, to remove the pins by crosspieces equipped with axles which one fits in the centering holes of the template in which the pins were disposed and in the centering holes of the board, and to drill fixation holes on the first ejection board.

The mounting of the three tools is immediate due to the fact that the fixation holes are all ready. Moreover, the tools are registered on the first cutting rule, having the contour of the cutting form, such that they allow the carrying out of cutting operations with a great precision.

In order to mount the cutting form on the first station of the press it suffices to equip the support element of the cutting form with a wedge having a profile identical to that of the fixed stop, to drill on said support element holes distributed identically to the holes of the template, to arrange on the support element the pre-drilled cutting form in leading the first cutting rule of the latter into abutment against the wedge and the holes into coincidence and joining together the cutting form and the support element; for example, by means of screws passing through the holes.

In order to mount the first ejection board on the press one equips the second station of the press with a crossbar equipped with centering pawns of which the mutual spacings are identical to those existing between the pre-drilled fixation holes on the first ejection board, the latter is then fixed on the crossbar by means of squares, of which one leg is screwed in the corresponding holes of the board and of which the other leg, equipped with a slot, is pitched on one of said pawns of the crossbar, and one longitudinally positions said crossbar; for example, by means of crosspieces, so that the first ejection board is disposed correctly registered on the first cutting rule.

The mounting of the second ejection board on the press is effected by equipping the third station of the press with a centering plate exhibiting a plurality of slots distributed identically to the pre-drilled holes on the second ejection board and by fixing the latter on said centering plate, for example, by means of screws passing into the slots and into the holes, the shanks of the screws being more or less advanced toward the bottom of the slots in order that the rear edge of the second ejection board is registered on the first cutting rule.

The invention likewise relates to an apparatus for carrying out the afore-mentioned process. This apparatus is characterized in that it comprises essentially a premounting template equipped on its lower edge with a fixed rectilinear stop on which there comes to be supported: the first cutting rule of the cutting form, a horizontal bar which is vertically mobile on the surface of the template, on which there can come to be supported the lower edge of the first ejection board or of the second ejection board, means of fine adjustment of the height of the bar, a plurality of holes through which can be drilled the centering holes on the three tools and the fixation holes on the cutting form and on the first ejection board.

BRIEF DESCRIPTION OF THE DRAWINGS

One mode of realization of the invention shall be described in detail now with regard to the accompanying drawings, in which:

FIG. 1 is a schematic elevation view of the kinematic chain of an automatic platen press;

FIG. 2 is a plan view of the three stations served by said kinematic chain;

FIG. 2a is an enlarged perspective view of the frame of the first station equipped with the cutting form;

FIG. 3 is a perspective view illustrating the fixation means of the first ejection board on the second station of the press;

FIG. 4 is an elevation view illustrating the fixation mode of the second ejection board on the third station of the press;

FIG. 5 is a perspective view showing the mode of execution of the stop, in registry on the first cutting rule on the cutting form;

FIG. 6 is a plan view of the cutting form;

FIG. 7 is an elevation view of the pre-mounting template according to the invention;

FIG. 8 is a cross-section view of the template bearing the cutting form;

FIG. 9 is a view in the direction of the arrow $F_1$ of FIG. 8;

FIG. 10 shows the template equipped with locking pins;

FIG. 13 shows the first ejection board in position on the template, with its brackets being turned toward the exterior;

FIG. 14 is a view of FIG. 13 in the direction of the arrow $F_3$ of FIG. 13;

DESCRIPTION OF THE PREFERRED EMBODIMENTS

Figure 12:
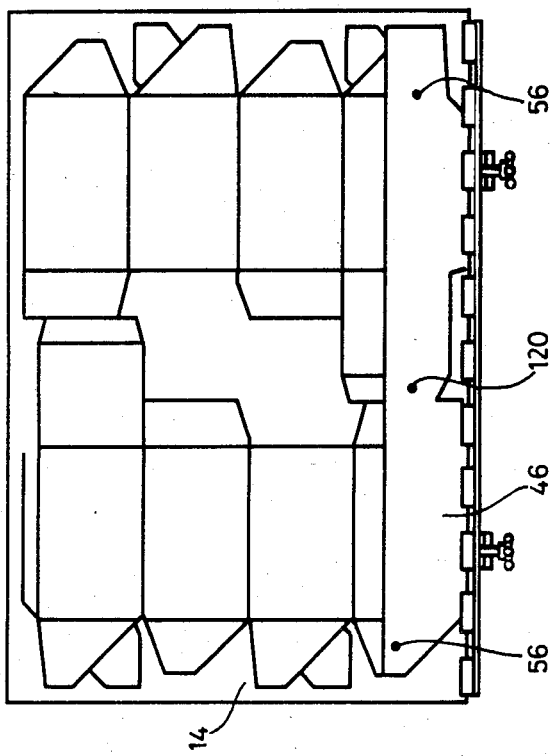
FIG. 12 shows a view in the direction of the arrow $F_2$ of FIG. 11.

With reference to FIGS. 1 and 2, the kinematic chain of the automatic platen press in accordance with the invention comprises at least one endless transport chain 10 running around non-illustrated pulleys, one of them being a driving pulley. Transversely to the direction of movement the chain carries regularly spaced gripping bars 12 intended to seize the cardboard box-blank to be cut by a transverse edge.

The cardboard box-blanks are successively led to three processing stations. Mounted at the first station is a cutting form 14 intended to cut the form according to the desired contour and to mark the folding lines. The cutting form is fixed on a form-bearing frame 16 drilled on its entire surface with fixation holes 18. The cutting form and its mode of fixation on the frame 16 shall be described in detail in the following.

According to the invention, the registering mark which one takes into consideration is defined by the first cutting rule 20 of the form (FIG. 2a) as shall be explained, and not by the edge 22 of the frame which varies from one model of the press to the other.

Fixed on the second station is a first ejection board 24 having the same form as that of the finished box-blank and which, when it cooperates with a press cradle 26, strips the cutting wastes and ejects them, the finished box-blank remaining positioned on the first ejection board.

As one can see from FIGS. 2 and 3, the fixation is realized by means of two squares 28 of which the horizontal arm is fixed by screws 30 in pre-drilled holes 32 on the board 24 and equipped with T-nuts 34 and of which the vertical arm exhibits a slot 36 permitting the pitching of the squares on centering pawns 38 provided on a board bearing crossbar 40 being made connected with a first ejection cradle 42 by crosspieces 44 of predetermined length. Mounted on the third station is a second ejection board 46 intended to sever the box-blank from the boarder of gripping engagement by which it is seized by the gripping bars 12, the box-blank then being ejected toward a pile of finished box-blanks.

As shown in FIGS. 2 and 4, the second ejection board 46, pre-drilled on the template, as shall be explained in the following, is fixed on a centering plate 48 by means of bolts screwed into crosspieces 52, the latter themselves being equipped with a threaded pin 54 engaging in one of the holes 56 of the board 46 and which becomes fastened in a T-nut 58. The position of the board 46 can be adjusted relative to the direction of displacement of the chain 10 due to the fact that the fixation bolts 50 can slide more or less deeply along slots 60 provided on a transverse edge of the plate 48. The centering plate 48 is connected with a crossbar 62 of the press.

The cutting form 14 and the boards 24 and 46 can be adjusted in position so as to be in registry on the first cutting rule of the form 14, as one shall now explain.

With reference to FIGS. 5 and 6, the cutting form 14 is made up of a rectangular wooden board on which cutting rules 64 are fitted which are intended to cut the cardboard box-blank according to the desired contour and on which creasing rules 66 are fitted capable of marking on the box-blank the lines of creasing and of folding.

In conformity with the invention, the front edge 68 of the form is machined; for example, by means of a milling head 70, to a depth inferior to the thickness of the form and flush with the first cutting rule 20. One thus makes appear an edge of gripping engagement 74 which shall serve simultaneously for registering the different tools during drilling of the centering and fixation holes and for the fixation on the mounting frame 16 (FIG. 2).

Said drilling operations are realized on a premounting template 76 shown in FIG. 7. The template is shown in the form of a rigid plate, more or less vertical, fixed on a metallic frame 78 mounted on a bench 80. The template exhibits over its entire surface elongated and relatively wide apertures allowing to see the implantation of the rules on the form and to thus avoid damaging them during the drilling of holes on the three tools from the back of the template. In a realization variant, the template is realized in a transparent material. It is no longer necessary thus to provide the apertures 82. It likewise comprises a plurality of holes 84 regularly distributed over the entire surface serving the purpose of guiding the drilling of fixation holes on the tools. In the low part, the template comprises a plurality of holes 86 permitting the selection of the two centering holes to be drilled on the three tools, as shall be explained in the following, and several holes 88 grouped in series of threes, intended for drilling of the holes 32 (FIG. 3) for the fixation of the squares 28 of the first ejection board. All these holes are equipped with guide bodies 89 intended to protect the edges of the holes and to guide the bit of the drill.

As shown in FIGS. 7 through 9, the template 76 is equipped on its lower edge with a fixed stop 90, arranged following a horizontal line parallel to the plane of the template and located slightly in front of the latter so that when the cutting form 14 is disposed horizontally on the template it is in support by its first cutting rule 20 on said stop 90 and so that the edge of gripping engagement 74 is placed behind the stop. In front of said stop there is mounted a mobile bar 92 bearing a plurality of stops 94 separated by intervals allowing to see between the stops 94 the first cutting rule 20 of the cutting form. In a variant of realization, the mobile bar 92 is realized in a transparent material. In this case it can be rectilinear, without stops or intervals, the first rule being visible by transparency. The stops 94 exhibit a square profile 96 on which the lower edge of the first and second ejection boards can be placed. The mobile bar 92 can be adjusted in height by means of setting screws 98 so as to be able to bring the profile 96 of the stops 94 to the same level as the first cutting rule 20.

On the back of the template 76 there is fixed a frame 100 on which holes 102 are drilled which are facing and according to the same arrangement as the centering holes 86 of the template. The holes 102 and 103 allow the guiding of the drill bit during the drilling of the centering and fixation holes on the three tools.

The template likewise comprises a holding bar 104 displaceable on the surface of the template by a classic wire system 106, pulleys 108, and control button 110, and serving the purpose of keeping the tool immobile during the drilling of the holes.

Figure 11:
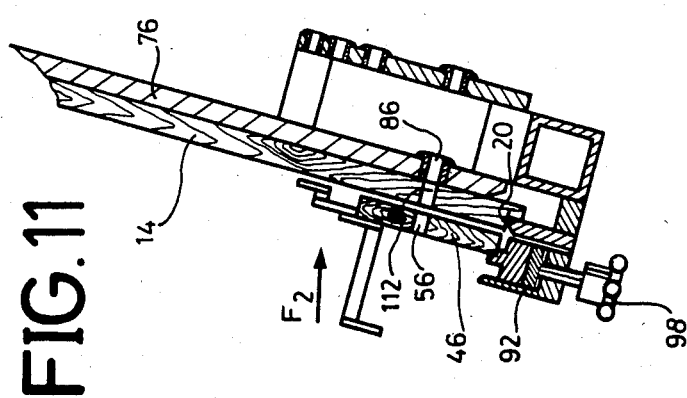
FIG. 11 shows the second ejection board positioned in superposition with the cutting form on the template.
Figure 16:
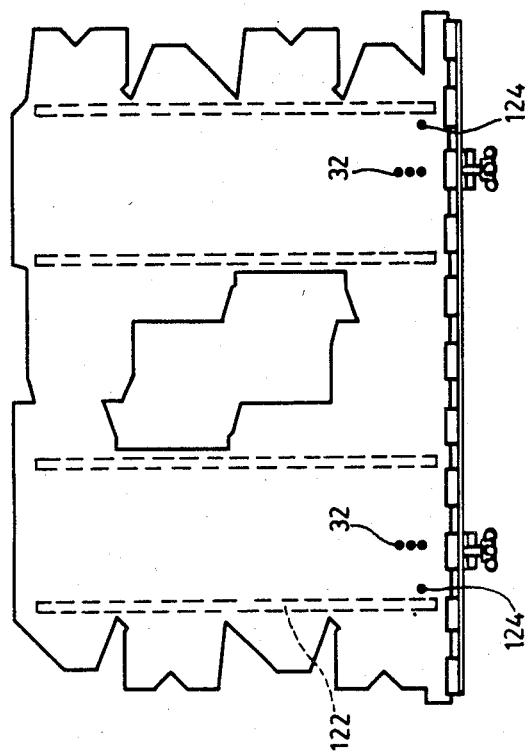
FIG. 16 is a view in the direction of the arrow $F_4$ of FIG. 15.
Figure 15:
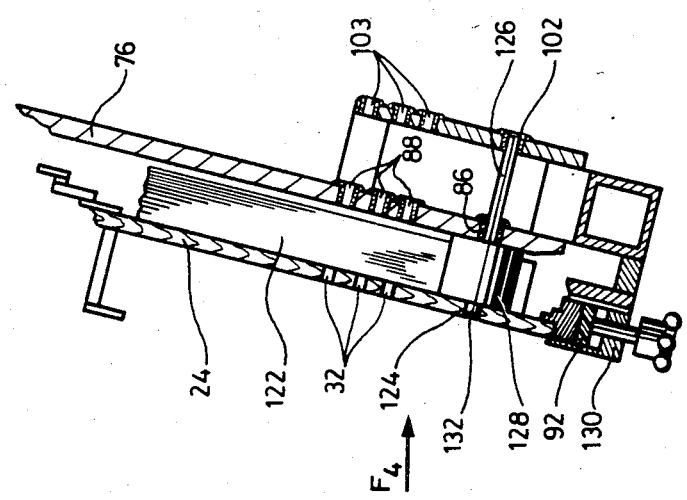
FIG. 15 shows the first ejection board on the template, the brackets being turned toward the template and the cutting form having been withdrawn.

Now the mode of predrilling of the tools prior to their mounting in the press shall be described, with reference to FIGS. 8 to 16.

The first operation relates to the drilling of holes on the cutting form. For this purpose, with reference to FIGS. 8 and 9, the cutting form 14 is placed on the surface in front of the template, the first cutting rule 20 being placed on the fixed stop 90. The holding bar 104 is applied against the upper part of the form. From the back of the template, two holes 112 are then drilled on the form through holes 86 suitably selected on the lower part of the template in order to not fall on a rule of the form, and in being guided with corresponding holes 102 on the frame 100; said two holes 112 will serve the purpose of centering of said form.

As shown in FIG. 10, in each of these two centering holes, a pin 114 is engaged which shall serve the purpose of immobilizing the form during the subsequent operations.

Six to eight fixation holes 116 are then drilled on the form, in distributing them in the best possible fashion and in selecting them among the range of holes 84 predrilled in the template. The holes 116 will be provided with T-nuts in order to facilitate the mounting on the frame of the cutting press.

The second operation consists in drilling centering holes on the second ejection board 46. For this purpose, the latter is placed on the inner square 96 of the mobile bar (FIGS. 11 and 12), it being registered on the first cutting rule 20 of the cutting form which is already disposed on the template. The positioning of the board 46 is improved by means of the two setting screws 98 of the mobile bar until the lower edge of the board 46 is in the same plane as the plane of the first cutting rule.

Finally, two centering holes 56 are then drilled perpendicularly to those already made on the form, alternately removing one pin 114, then the other, and possibly a supplementary fixation hole 120. The centering holes will serve the purpose of mounting the board 46 on the machine at the third station (FIGS. 1 and 2) which comprises the metallic plate 48 with bolts 50. All these holes will be equipped with T-nuts 58 into which the crosspieces 52 of positioning on the machine come to be engaged (FIG. 4).

The third operation consists in drilling two centering holes on the first ejection board 24. To this end the second ejection board is removed from the template 76 (FIGS. 13 and 14) and one puts in its place the first ejection board 24, stakes 122 turned toward the exterior, in centering it on the interior of cutting rules of the circumference 64 of the form 14. The positioning is improved as in the preceding with the setting screws 98, and two centering holes 124 are drilled, alternately removing one pin, then the other.

In a fourth operation holes for the fixation of the board 24 on the machine are drilled: for this purpose, the first ejection board 24 is removed (FIGS. 15 and 16), then the form 14. The axles 126 of two crosspieces 128 are, respectively, introduced in the centering holes 86 of the template. One then replaces the board 24 after having turned it over, stakes 122 against the template and with its lower edge resting on an exterior square 130 of the mobile bar 92. One engages the axles 132 of the crosspieces 128 in the centering holes 124 of the board 24. The latter is then disposed correctly centered. One then drills the two series of three holes 32 (FIG. 3 and 16) in which the squares 28 shall come to be engaged, as has been explained in the preceding.

The assembly of the three tools thus predrilled can now be effected very rapidly and with precision. The form 14 is fixed on the form bearing frame 16 (FIGS. 2 and 2a) by means of screws becoming screwed into the fixation hole 116 of the form and into the holes 18 of the frame, the registry being made up the first cutting rule 20 of the form coming into support on a wedge 134 of the same form and with recesses 133 identical to those of the bar 90 so as to obtain the same support points on the two bars, even in case of irregularity of the edge of the cutting form.

The first ejection board 24 is mounted on the second station. To this end, one mounts the squares 28 on the board 24 and one engages the slots 36 of the squares (FIG. 3) on the pawns 38 of the crossbar 40. To this end, the pawns are spaced apart a distance equal to that existing between the fixation holes 32 on the board 24 and the crosspieces 44 have a length such that the board 24 is disposed correctly registered on the first cutting rule.

The second ejection board 46 is finally mounted on the third station in sliding the bolts 50 in the slots 60 of the centering plate 48. To this end, the slots are distributed identically to the holes 56 of the second ejection board 46, and the pins of the bolts 50 are more or less advanced toward the base of the slots in order that the rear edge of the board 46 is registered on the first cutting rule.

We claim:

1. An apparatus for producing centering holes and mounting holes in a cutting form having cutting rules and in at least one ejection board of a platen press, said apparatus comprising a pre-mounting template being provided on its lower edge with a fixed rectilinear stop on which one of the cutting rules of the cutting form is receivable, a horizontal bar with a support surface being mounted on the template adjacent the stop, means for adjusting the support surface relative to the stop, said template having a pair of centering hole guides and a pattern of distributed mounting hole guides so that with a cutting form on the stop, centering holes and mounting holes can be drilled into the cutting form and by positioning a board on the support surface, centering holes can be formed that are aligned with the centering holes on the cutting form.

2. An apparatus according to claim 1, wherein the template has a plurality of elongated apertures so that the position of the rules on the cutting form can be observed through the template.

3. An apparatus according to claim 1, wherein the template is made of a transparent material.

4. An apparatus according to claim 1, wherein the bar has recesses to enable observing the alignment of a lower edge of the ejection board and a first cutting rule of the cutting form.

5. An apparatus according to claim 1, wherein the bar is rectilinear and is constructed of a transparent material.

6. An apparatus according to claim 1, wherein the template includes a horizontal holding bar movable along a front face of the template, said bar serving the purpose of immobilizing each of one of the board and the form in a position on the template during the drilling of the holes.

7. An apparatus according to claim 1, wherein the template includes a parallel plate member which is spaced from the template, said plate members having holes aligned with the mounting holes and the centering holes of the template.

8. An apparatus according to claim 1, wherein the different holes of the template are provided with guides intended to guide the bit of the drilling tool.

* * * * *